US010760482B1

(12) United States Patent
Herhusky et al.

(10) Patent No.: US 10,760,482 B1
(45) Date of Patent: Sep. 1, 2020

(54) METHODS AND SYSTEM FOR REDUCING A POSSIBILITY OF SPARK PLUG FOULING

(71) Applicant: Ford Global Technologies, LLC, Dearborn, MI (US)

(72) Inventors: Nicholas Herhusky, Dearborn, MI (US); Scott Steadmon Thompson, Belleville, MI (US); John Eric Rollinger, Troy, MI (US); David Lew, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/444,790

(22) Filed: Jun. 18, 2019

(51) Int. Cl.
*B60W 10/08* (2006.01)
*F02D 41/22* (2006.01)
*F02P 13/00* (2006.01)
*F02B 77/04* (2006.01)
*F02P 17/02* (2006.01)

(52) U.S. Cl.
CPC .............. *F02B 77/04* (2013.01); *F02P 17/02* (2013.01)

(58) Field of Classification Search
CPC ... B60L 2270/32; B60W 10/08; B60W 20/00; B60W 10/26; F02D 2200/1015; F02D 41/221; F02D 37/02; F02D 2041/026; F02P 13/00
See application file for complete search history.

(56) References Cited

U.S. PATENT DOCUMENTS

| | | | | |
|---|---|---|---|---|
| 7,063,079 | B2 * | 6/2006 | Huberts | F02P 3/045 123/630 |
| 7,137,385 | B2 * | 11/2006 | Newton | F02P 3/045 123/630 |
| 7,312,964 | B2 | 12/2007 | Tchernobrivets | |
| 9,061,680 | B2 * | 6/2015 | Dalum | B60W 20/10 |
| 9,719,436 | B2 * | 8/2017 | Glugla | F02D 13/02 |
| 10,302,063 | B2 * | 5/2019 | Glugla | F02P 5/1455 |
| 2010/0057324 | A1 * | 3/2010 | Glugla | F02P 17/12 701/102 |
| 2013/0193923 | A1 * | 8/2013 | Kimura | H01R 13/6275 320/109 |
| 2013/0240369 | A1 * | 9/2013 | McAlister | H02J 3/382 205/343 |
| 2015/0192632 | A1 | 7/2015 | Crosman, III et al. | |
| 2018/0094597 | A1 | 4/2018 | Guo et al. | |
| 2019/0202305 | A1 * | 7/2019 | Jung | B60L 53/14 |

OTHER PUBLICATIONS

Herhusky, N. et al., “Methods and Systems for Engine Idle Stop,” U.S. Appl. No. 16/440,514, filed Jun. 13, 2019, 40 pages.
Herhusky, N. et al., “Method for Operating a Vehicle Having an Electrical Outlet,” U.S. Appl. No. 16/562,287, filed Sep. 5, 2019, 40 pages.

* cited by examiner

*Primary Examiner* — Long T Tran
(74) *Attorney, Agent, or Firm* — Geoffrey Brumbaugh McCoy Russell LLP

(57) ABSTRACT

Systems and methods for operating a vehicle that includes an engine and an electric machine are described. In one example, operation of the engine may be adjusted to compensate for conditions when carbon deposits may build on one or more engine spark plugs. The engine adjustments may help to remove carbon deposits from the engine's spark plugs.

20 Claims, 5 Drawing Sheets

METHODS AND SYSTEM FOR REDUCING A POSSIBILITY OF SPARK PLUG FOULING

FIELD

The present description relates to methods and a system for a vehicle that includes an electric machine for electrical power to external electrical power consumers.

BACKGROUND AND SUMMARY

A vehicle may include an electric machine that may provide a propulsion force to the hybrid vehicle. The electric machine may also supply alternating electrical current to external electrical power consumers from time to time. Further, in some examples, the electric machine may not provide propulsion force for the vehicle. In one example, a hybrid vehicle may be parked at a construction site and the engine of the hybrid vehicle may rotate the armature of the electric machine so that the electric machine may supply electric power to electric power consumers that are external or off-board the hybrid vehicle. The engine of the hybrid vehicle may operate at a variety of speeds and loads to meet the electrical power consumption of the electric power consumers. The engine may also be operated with the electric machine to generate electric power for several hours each day. During some engine operating conditions while the engine and the electric machine are operating to generate electrical power, carbon may tend to build on the engine's spark plugs. If the amount of carbon deposited on the engine's spark plugs is greater than a threshold amount, the engine may misfire. On the other hand, carbon may be removed from the engine's spark plugs while the engine and the electric machine are operating to generate electrical power. Whether or not carbon is being deposited on or being removed from spark plugs depends on the speed and load at which the engine is operating. In addition, the amount of carbon deposited or removed from the spark plugs may vary depending on the speed and load at which the engine is operated. Users of the vehicle may notice engine speed changes if the engine begins to misfire and engine emissions may increase if the engine begins to misfire. Therefore, it may be desirable to provide a way of mitigating the possibility of engine misfires.

The inventors herein have recognized the above-mentioned issues and have developed a powertrain operating method, comprising: characterizing each of a plurality of engine operating regions as one or more carbon building regions, one or more carbon removing regions, or one or more carbon neutral regions; measuring an amount of time an engine operates in the one or more of the carbon building regions via a controller while the engine rotates an electric machine that provides power to external power consumers; and adjusting operation of the engine to operate in one or more of the carbon removing regions while the engine rotates the electric machine that provides power to the external power consumers in response to the amount of time exceeding a threshold.

By adjusting operation of an engine that is coupled to an electric machine that provides power to external electrical power consumers, it may be possible to reduce the possibility of engine misfires when supplying power to electrical power consumers. In particular, if the engine is operating at light loads where carbon may accumulate on the engine's spark plugs while electrical power consumers are electrically coupled to an electric machine that is rotated via the engine, engine speed may be increased even though a load that may be provided by the external electrical power consumers has not changed. By increasing the engine speed, spark plug temperatures may increase, thereby oxidizing carbon that may accumulate on the engine's spark plugs so that the possibility of engine misfires may be reduced. In addition, a load that the electric machine provides to the engine may be increased to further reduce the possibility of spark plug fouling. The increased electric machine load may be used to charge an electric energy storage device that is on-board the vehicle so that beneficial work may be generated by increasing the engine load.

The present description may provide several advantages. In particular, the approach may improve engine operation while an engine is being used to generate electrical power. Further, the approach may provide beneficial work when carbon is being removed from engine spark plugs. In addition, the approach provides compensation for times when the engine is operated in carbon removing operating conditions. Further still, the method described herein may be applied to engines that are operated at extended idle conditions, irrespective of if the engine is driving a mechanical load, or a load that generates electrical power, or no external load.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a hybrid vehicle that includes an engine and an electric machine. The electric machine may be operated to provide electrical power to external electrical power consumers. The vehicle may include an engine of the type shown in FIG. 1. The engine may be included in a driveline as shown in FIG. 2. The vehicle driveline may operate according to the sequence of FIG. 3. The vehicle driveline may be operated according to the method of FIG. 4. The engine may include carbon building, carbon removing, and carbon neutral operating regions as shown in FIG. 5.

Figure 1:
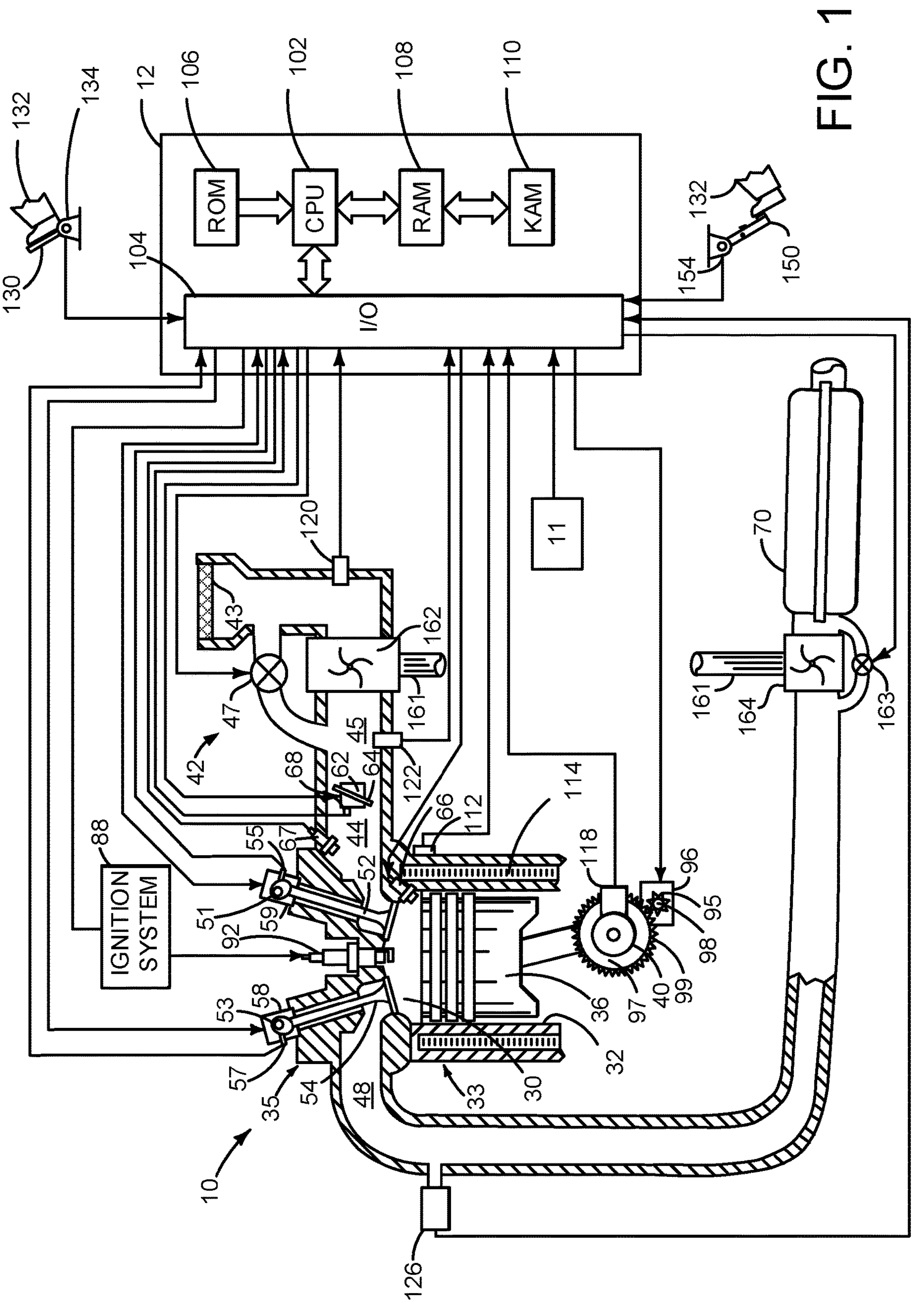
FIG. 1 is a schematic diagram of an engine.
Figure 2:
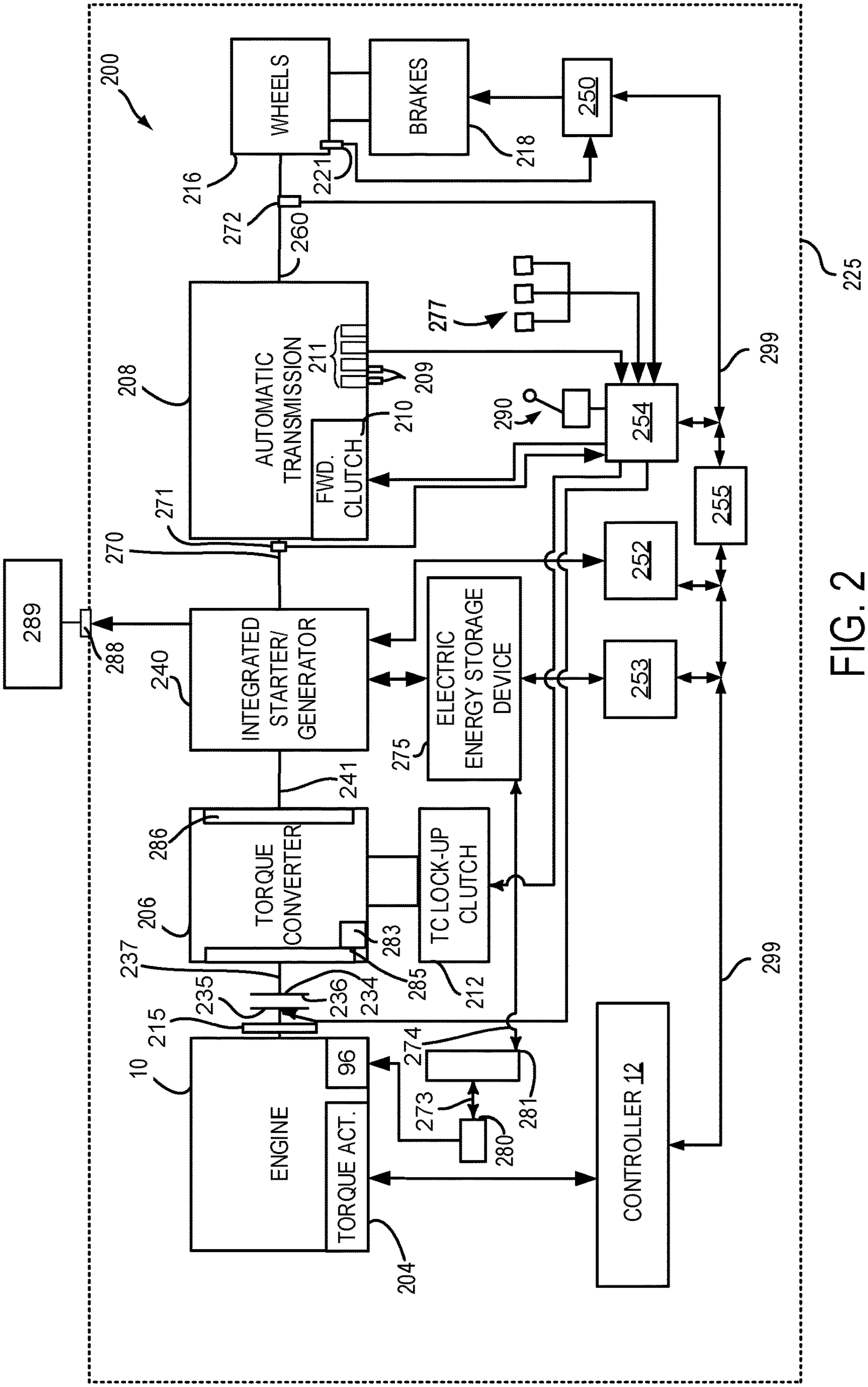
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a non-limiting vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and/or electric machine 240. However, in other examples, electric machine 240 may not provide propulsive force to the powertrain 200 and it may be positioned at the front end of engine 10 or another suitable location. Further, in another example, element 240 may be a mechanical power take-off for operating external mechanically driven devices. Engine 10 may be started via optional engine starting system shown in FIG. 1 or via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96. Electric machine 240 may supply alternating current to external electrical power consumers 289 via receptacle 288. External electrical power consumers 289 are located off-board vehicle 225 and they may be provided power when transmission 208 is engaged in park. External electrical power consumers 289 may include but are not limited to tools, entertainment devices, and lighting.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to torque converter impeller 285 via shaft 237. Disconnect clutch 236 may be fully closed when engine 10 is supplying power to vehicle wheels 216. Disconnect clutch 236 may be fully open when engine 10 is stopped (e.g., not combusting fuel).

Torque converter 206 includes a turbine 286 to output power to shaft 241. Input shaft 241 mechanically couples torque converter 206 to ISG 240. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission. Torque may be transferred via fluid from impeller 285 to 286.

When torque converter lock-up clutch 212 is fully disengaged, torque converter 206 transmits engine power to automatic transmission 208 via fluid transfer between the torque converter turbine 286 and torque converter impeller 285 or vice-versa, thereby enabling torque multiplication. In contrast, when torque converter lock-up clutch 212 is fully engaged, the engine output power may be directly transferred via the torque converter clutch to an input shaft 241 of ISG 240. Alternatively, the torque converter lock-up clutch 212 may be partially engaged, thereby enabling the amount of engine torque directly relayed to the ISG to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the input shaft 270 of automatic transmission 208. The upstream side of the ISG 240 is mechanically coupled to the turbine 286 of torque converter 206. ISG 240 may provide a positive power or a negative power to powertrain 200 via operating as a motor or generator as instructed by electric machine controller 252.

ISG 240 may rotate turbine 286, which in turn may rotate impeller 285 to start engine 10 during engine starting. Torque converter 206 may multiply torque of ISG 240 to rotate engine 10 when driveline disconnect clutch 236 is fully closed. Thus, the torque of ISG 240 may be increased via torque converter 206 to rotate engine 10 during engine starting. TCC 212 may be fully open when ISG 240 is cranking engine 10 so that torque of ISG 240 may be multiplied. Alternatively, TCC 212 may be partially open when ISG 240 is cranking engine 10 to manage torque transfer to engine 10. ISG 240 may rotate at a greater speed than engine 10 during engine cranking.

Automatic transmission 208 includes gear clutches 211 (e.g., for gears 1-10) and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG. Vehicle system controller 255 requests the engine power from engine controller 12 and the ISG power from electric machine controller 252. If the engine power that flows through torque converter 206 and ISG power is less than a transmission input power limit (e.g., a threshold value not to be exceeded), the power is delivered to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, sensor for determining torque transferred via the transmission clutches, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine in a hybrid vehicle driveline; an electric machine in the hybrid driveline; and a controller including executable instructions stored in non-transitory memory to adjust operation of the engine in response to an amount of time the engine operates in one or more carbon building regions exceeding a threshold while the electric machine is electrically coupled to an external electric power consumer. The system includes where adjusting operation of the engine includes increasing engine speed and load. The system further comprises additional instructions to increase output of the electric machine in response to the amount of time the engine operates in one or more carbon building regions exceeding the threshold. The system further comprises additional instructions to store the increased output of the electric machine in an electric energy storage device. The system includes where operation of the engine is adjusted while a transmission coupled to the electric machine is engaged in park. The system further comprises adjusting operation of the engine in further response to an amount of time the engine operates in one or more carbon removing regions being less than a threshold.

Figure 3:
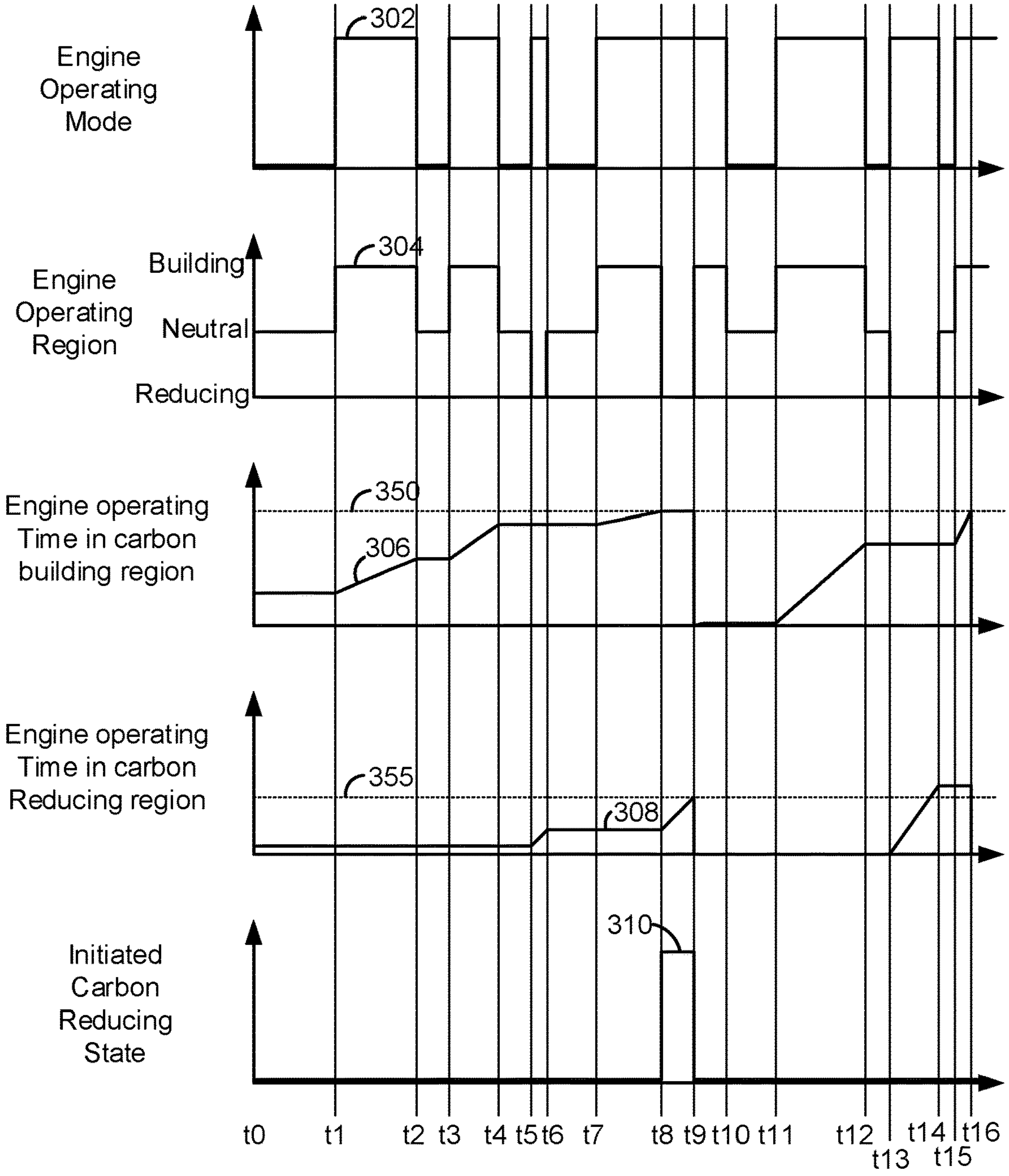
FIG. 3 shows an example engine operating sequence.
Figure 4:
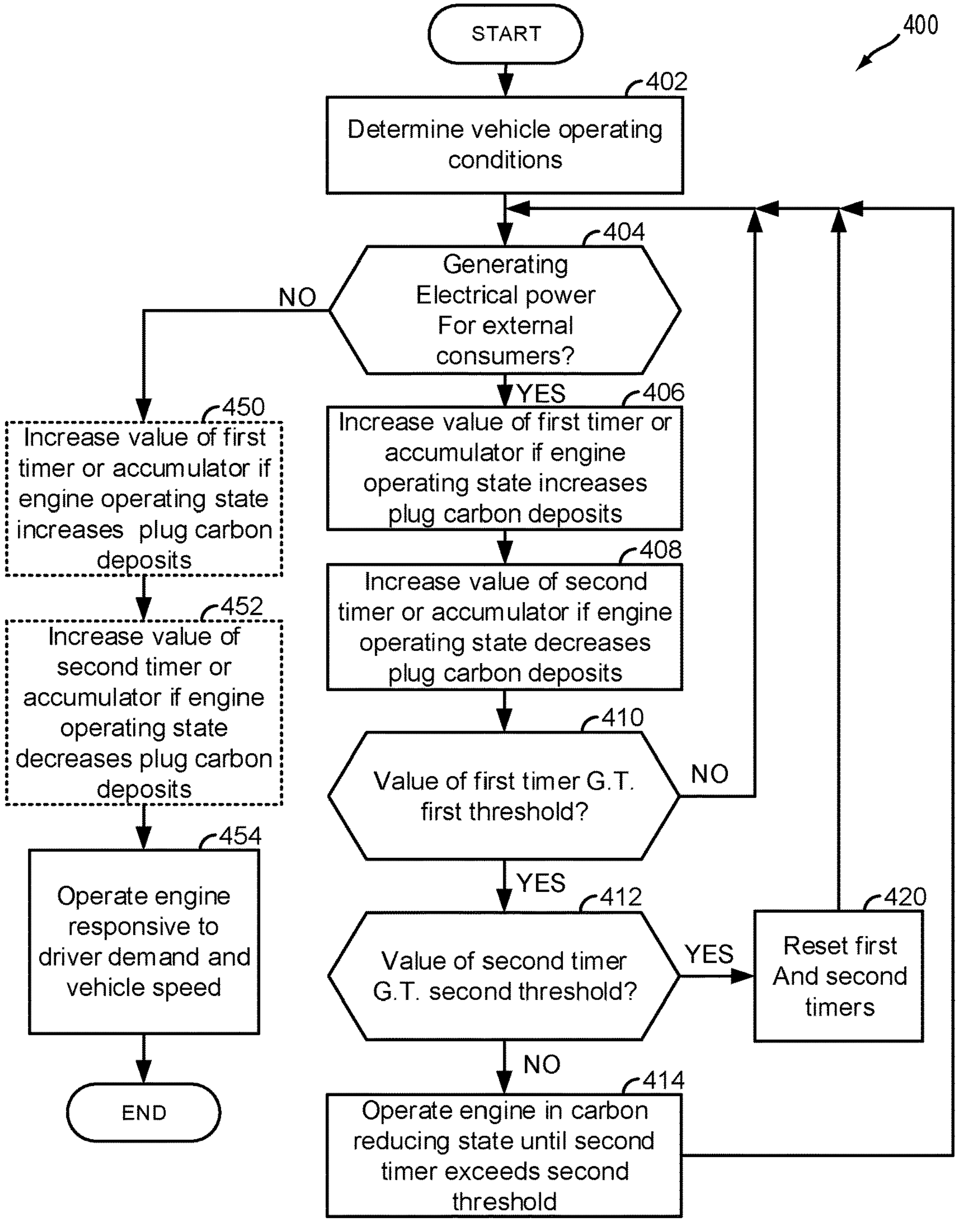
FIG. 4 shows an example method for operating an engine that supplies electrical power to external electrical power consumers.
Figure 5:
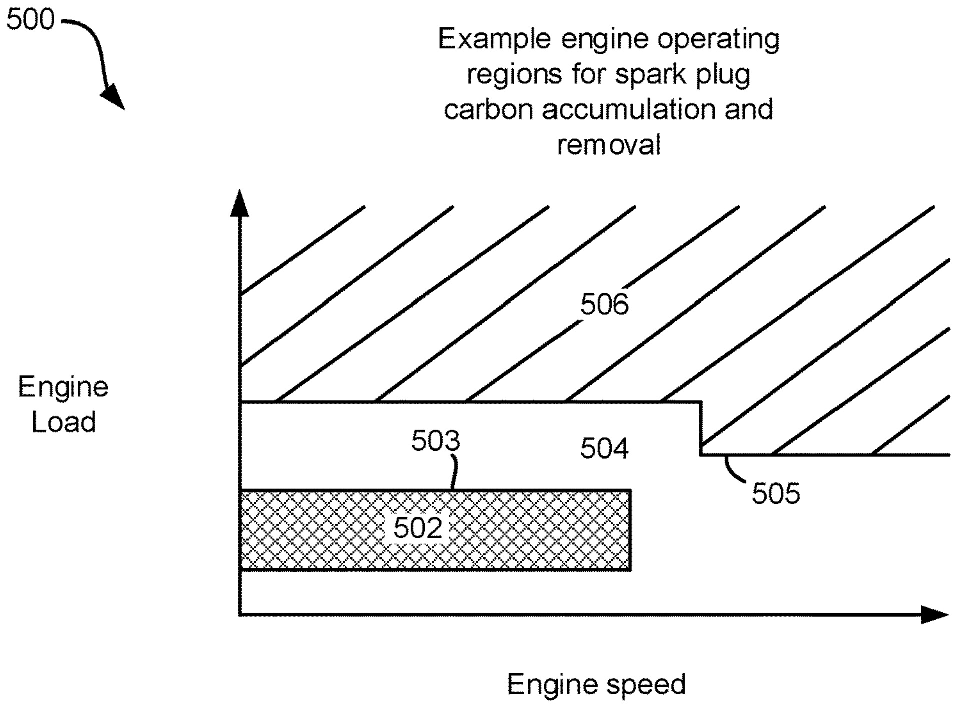
FIG. 5 shows an engine map with example carbon building, carbon removing, and carbon neutral regions.

Referring now to FIG. 3, plots of a prophetic vehicle operating sequence according to the method of FIG. 4 and the systems of FIGS. 1 and 2 are shown. The plots are aligned in time and occur at a same time. The vertical lines at t0-t16 show particular times of interest.

The first plot from the top of FIG. 3 is a plot of an engine operating mode versus time. The vertical axis represents the engine operating mode and the engine is activated (e.g., rotating and combusting fuel) when trace 302 is at a higher level near the vertical axis arrow. The engine is not activated (e.g., not combusting fuel) when trace 302 is near the level of the horizontal axis. The horizontal axis represents time and the time increases from the left side of the figure to the right side of the figure. Trace 302 represents the engine operating state.

The second plot from the top of FIG. 4 is a plot that indicates the operating region of the engine. The vertical axis represents the engine operating region and the engine operating region is indicated along the vertical axis. The level "Building" indicates that the engine is operating in a region (e.g., engine speed and load) where carbon may be accumulating on one or more engine spark plugs. The level "Neutral" indicates that carbon accumulating on the engine's spark plugs is not substantially increasing or decreasing. The level "Reducing" indicates that carbon accumulation on the engine's spark plugs may be decreasing due to oxidation of carbon on the spark plugs. The horizontal axis represents time and the time increases from the left side of the figure to the right side of the figure. Trace 304 represents the engine operating region.

The third plot from the top of FIG. 3 is a plot an accumulated amount of time that an engine operates in a carbon building region versus time. The vertical axis represents the accumulated amount of time that the engine operates the carbon building engine operating region (e.g., an accumulated amount of time that an engine operates in an engine operating region where carbon may build or accumulate on one or more engine spark plugs). The horizontal axis represents time and the time increases from the left side of the figure to the right side of the figure. Trace 306 represents the accumulated amount of time that the engine operates in the carbon building engine operating region.

The fourth plot from the top of FIG. 3 is a plot an accumulated amount of time that an engine operates in a carbon reducing region versus time. The vertical axis represents the accumulated amount of time that the engine operates the carbon reducing engine operating region (e.g., an accumulated amount of time that an engine operates in an engine operating region where carbon may be reduced on one or more engine spark plugs). The horizontal axis represents time and the time increases from the left side of the figure to the right side of the figure. Trace 308 represents the accumulated amount of time that the engine operates in the carbon reducing engine operating region. Horizontal line 350 is a threshold level that when exceeded by trace 306 may cause the initiation of the carbon reducing state.

The fifth plot from the top of FIG. 3 is a plot of an initiated carbon reducing state versus time. The vertical axis represents the initiated carbon reducing state and the initiated carbon reducing state is activated when trace 310 is at a higher level near the vertical axis arrow. The initiated carbon reducing state is not activated when trace 310 is at a lower level near the horizontal axis. Trace 310 represents the initiated carbon reducing state. Engine operation is adjusted for the engine to be actively engaged in the initiated carbon reducing state such that engine load may be increased to increase spark plug temperature so that carbon may be oxidized from the engine's spark plugs. Horizontal line 355 is a threshold level that when exceeded by trace 308 may cause the amounts of time the engine operated in the carbon building regions and carbon reducing regions to be reset to zero.

At time t0, the engine is off and the engine operating region is carbon neutral. The amount of engine operating time in the carbon building region is low and the amount of engine operating time in the carbon reducing region is low. The initiated carbon reducing state is not activated so engine operation is not adjusted.

At time t1, the engine is activated and the engine begins operating in the carbon building region so that the amount of time that the engine operates in the carbon building region begins to increase. The amount of time that the engine operates in the carbon reducing region is not adjusted. The engine rotates the electric machine and the electric machine is coupled to external electrical power consumers (not shown). Engine operation and electric machine operation are adjusted to provide the external power consumers the power that they request (not shown). The initiated carbon reducing state is not activated so engine operation is not adjusted.

At time t2, the engine is deactivated and the engine stops operating so that it is in the carbon neutral region. The amount of time that the engine operates in the carbon building region ceases increasing. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t3, the engine is activated again and the engine begins operating in the carbon building region so that the amount of time that the engine operates in the carbon building region begins to increase. However, the timer increases at a faster rate than at time t1 because the amount of carbon that is generated at time t3 is determined to be greater than at time t1. The amount of time that the engine operates in the carbon reducing region is not adjusted. The engine rotates the electric machine and the electric machine is coupled to external electrical power consumers (not shown). The initiated carbon reducing state is not activated so engine operation is not adjusted.

At a time t4, the engine is deactivated again and the engine stops operating so that it is in the carbon neutral region. The amount of time that the engine operates in the carbon building region ceases increasing. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t5, the engine is activated again and the engine begins operating in the carbon reducing region so that the amount of time that the engine operates in the carbon reducing region begins to increase. The amount of time that the engine operates in the carbon building region is not adjusted. The engine rotates the electric machine and the electric machine is coupled to external electrical power consumers (not shown). The initiated carbon reducing state is not activated so engine operation is not adjusted.

At a time t6, the engine is deactivated again and the engine stops operating so that it is in the carbon neutral region. The amount of time that the engine operates in the carbon reducing region ceases increasing. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t7, the engine is activated again and the engine begins operating in the carbon building region again so that the amount of time that the engine operates in the carbon building region begins to increase again. However, the timer increases at a slower rate than at time t1 because the amount of carbon that is generated at time t7 is determined to be less than at time t1. The amount of time that the engine operates in the carbon reducing region is not adjusted. The engine rotates the electric machine and the electric machine is coupled to external electrical power consumers (not shown). The initiated carbon reducing state is not activated so engine operation is not adjusted.

At a time t8, the engine remains activated, but the amount of time that the engine operates in the carbon building region exceeds threshold 350 and the amount of time that the engine operated in the carbon reducing region is less than threshold 355, so the initiated carbon reducing state is activated and the engine is adjusted to operate in the carbon reducing region. The amount of time in the carbon reducing region begins to increase again.

At time t9, the engine remains activated and the amount of time that the engine operates in the carbon reducing region exceeds threshold 355, so both amount of time that the engine operates in the carbon building region and the amount of time that the engine operates in the carbon reducing region are reset to values of zero. In addition, the initiated carbon reducing state is deactivated so that the engine is adjusted to operate in the carbon building region again.

At time t10, the engine is deactivated and the engine stops operating so that it is in the carbon neutral region. The amount of time that the engine operates in the carbon building region ceases increasing. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t11, the engine is activated again and the engine begins operating in the carbon building region so that the amount of time that the engine operates in the carbon building region begins to increase. The amount of time that the engine operates in the carbon reducing region is not adjusted. The engine rotates the electric machine and the electric machine is coupled to external electrical power consumers (not shown). The initiated carbon reducing state is not activated so engine operation is not adjusted.

At time t12, the engine is deactivated and the engine stops operating so that it is in the carbon neutral region. The amount of time that the engine operates in the carbon building region ceases increasing. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t13, the engine is activated again and the engine begins operating in the carbon reducing region so that the amount of time that the engine operates in the carbon reducing region begins to increase. The amount of time that the engine operates in the carbon building region is not adjusted. The engine rotates the electric machine and the electric machine is coupled to external electrical power consumers (not shown). The initiated carbon reducing state is not activated so engine operation is not adjusted.

At a time t14, the engine is deactivated again and the engine stops operating so that it is in the carbon neutral region. Note that the amount of time that the engine operated in the carbon reducing region is greater than threshold 355. The amount of time that the engine operates in the carbon reducing region is not adjusted. The engine stops rotating the electric machine and the electric machine is coupled to external electrical power consumers (not shown). The initiated carbon reducing state is not activated so engine operation is not adjusted.

At time t15, the engine is activated again and the engine begins operating in the carbon building region so that the amount of time that the engine operates in the carbon building region begins to increase. The amount of time that the engine operates in the carbon reducing region is not adjusted. The engine rotates the electric machine and the electric machine is coupled to external electrical power consumers (not shown). The initiated carbon reducing state is not activated so engine operation is not adjusted.

At time t16, the amount of time that the engine operated in the carbon building region exceeds threshold 350. However, since the amount of time that the engine operated in the carbon reducing region exceeds threshold 355, the amount of time that the engine operates in the carbon building region and the amount of time that the engine operates in the carbon reducing region are reset to zero. The engine continues to operate in the carbon building region and the initiated carbon reducing state is not activated.

In this way, an engine may be actively engaged in a carbon reducing region to reduce an amount of carbon that may accumulate on engine spark plugs responsive to two different timers. The timers may be incremented at different rates so that the propensity for carbon to accumulate or be removed from spark plugs may be compensated.

Referring now to FIG. 4, a flow chart of a method for operating a vehicle engine and driveline in a way that may reduce the possibility of engine misfires while generating electrical power for external electrical power consumers is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to driver demand torque, transmission gear, vehicle speed, electric machine speed, engine speed, engine load, engine temperature, determining the engine operating region (e.g., carbon building region, carbon reducing region, carbon neutral region) and electric energy storage device state of charge (SOC). Method 400 may determine the engine operating region via indexing a map (e.g., as shown in FIG. 5) via the present engine speed and load. Method 400 proceeds to 404.

At 404, method 400 judges if the engine is driving and rotating the electric machine to supply electrical power to external electrical power consumers while the transmission is engaged in park or neutral. Method 400 may judge that the engine is driving the electric machine to supply electrical power to external electric power consumers based on operating states of electrical receptacles, the transmission gear shift lever, and the vehicle operating mode. If method 400 judges that the engine is driving the electric machine to supply electrical power to external electrical power consumers, the answer is yes and method 400 proceeds to 406. Otherwise, method 400 proceeds to 450. Method 400 may not supply power to the vehicle's electric energy storage unit when the engine and electric machine are supplying electrical power to external electric power consumers, unless the value of the first timer or first accumulator exceeds the first threshold. By not charging the electric energy storage device, it may be possible to reserve a portion of electric energy storage capacity in case initiation of the carbon reducing state is activated so that excess charge may be usefully stored.

At 406, method 400 allows a value of a first accumulator, or alternatively, a first timer to increase if method 400 judges that the engine is presently operating in a carbon building region (e.g., an engine operating region where an amount of carbon deposits on a spark plug is increasing). In other words, method 400 may measure an amount of time the engine operates in a carbon building region. In one example, a timer accumulates a total amount of time that the engine is operating in the carbon building region. The timer may increment in predetermined step amounts (e.g., 0.1 seconds) and the total amount of time that the engine operates in the carbon building region may be determined via summing the total number of 0.1 second increments. For example, if the timer increments 100 times, then the engine operated in the carbon building region for 10 seconds and the timer stores an accumulated value of 10.

Alternatively, each carbon building region is assigned a multiplier value. The multiplier value may be a scalar value that is greater than zero. In nominal carbon building regions, the carbon building regions may be assigned a multiplier value of one. In carbon building regions where carbon deposit formation is more significant, the carbon building regions may be assigned a multiplier value that is greater than one. In carbon building regions where carbon deposit formation is less significant, the carbon building regions may be assigned a multiplier value that is less than one. The multiplier values may be multiplied with timer increment values and the results may be added to a sum of other timer increment values that have been multiplied by other carbon building region multipliers and stored in an accumulator. For example, if the engine is operating at 700 RPM and 0.2 load, which is a carbon building region with a multiplier value of 1.1, and the timer increments each time interval of 0.1 seconds for 100 seconds, then the value stored in the accumulator after the 100 increments is the sum of one hundred multiplications of $1.1 \cdot 0.1$ or $1.1 \cdot 0.1 \cdot 100 = 11$.

At 408, method 400 allows a value of a second accumulator, or alternatively, a second timer to increase if method 400 judges that the engine is presently operating in a carbon reducing region (e.g., an engine operating region where an amount of carbon deposits on a spark plug is decreasing). In other words, method 400 may measure an amount of time the engine operates in a carbon reducing region. In one example, a timer accumulates a total amount of time that the engine is operating in the carbon reducing region. The timer may increment in predetermined step amounts (e.g., 0.1 seconds) and the total amount of time that the engine operates in the carbon reducing region may be determined via summing the total number of 0.1 second increments. For example, if the timer increments 100 times, then the engine operated in the carbon reducing region for 10 seconds and the timer stores an accumulated value of 10.

Alternatively, each carbon reducing region is assigned a multiplier value. The multiplier value may be a scalar value that is greater than zero. In nominal carbon reducing regions, the carbon reducing regions may be assigned a multiplier value of one. In carbon reducing regions where carbon reduction is more significant, the carbon reducing regions may be assigned a multiplier value that is greater than one. In carbon reducing regions where carbon reduction is less significant, the carbon reducing regions may be assigned a multiplier value that is less than one. The multiplier values may be multiplied with timer increment values and the results may be added to a sum of other timer increment values that have been multiplied by other carbon reducing region multipliers and stored in an accumulator. For example, if the engine is operating at 3000 RPM and 0.8 load, which is a carbon building region with a multiplier value of 1.1, and the timer increments each time interval of 0.1 seconds for 100 seconds, then the value stored in the accumulator after the 100 increments is the sum of one hundred multiplications of 1.1·0.1 or 0.1·0.1·100=11. Method 400 proceeds to 410.

At 410, method 400 judges if the value stored in the first timer or first accumulator is greater than a first threshold number. If so, the answer is yes and method 400 proceeds to 412. Otherwise, the answer is no and method 400 returns to 404.

At 412, method 400 judges if the value stored in the second timer or second accumulator is greater than a second threshold number. If so, the answer is yes and method 400 proceeds to 420. Otherwise, the answer is no and method 400 proceeds to 414.

At 420, method 400 resets the values of the first and second timers or accumulators to values of zero. Method 400 returns to 404. By resetting the timers or accumulators, conditions of the spark plugs may be evaluated without generating huge numbers in the timers or accumulators. Further, the threshold values may be maintained as useful measures for assessing spark plug degradation.

At 414, method 400 adjusts engine operation so that the engine is operating in a carbon reducing region. In particular, the initiation of the carbon reducing state is activated so that carbon may be removed from engine spark plugs. For example, the engine may be adjusted from 700 RPM and 0.2 load to 2500 RPM and 0.6 engine load to reduce carbon deposits that may be present on one or more engine spark plugs. The engine may be operated in the carbon reducing region up to a time when the value in the second timer or second accumulator exceeds the second threshold value. After the value in the second timer or second accumulator exceeds the second threshold value, the engine returns to an operating range that is based on the amount of electrical power that the electric machine is generating for the electrical power consumers. If the engine output is increased to operate the engine in the carbon reducing region, then the output of the electric machine may be increased and the amount of electric charge produced via the electric machine that is greater than the amount of electric charge consumed via external electric power consumers may be stored in the electric energy storage unit. Additional charge may not be supplied to the external electric power consumers. Method 400 returns to 404.

Optionally at 450, method 400 allows a value of a first accumulator, or alternatively, a first timer to increase if method 400 judges that the engine is presently operating in a carbon building region (e.g., an engine operating region where an amount of carbon deposits on a spark plug is increasing) as described at 406. By allowing the first timer or accumulator values to increase when the engine and electric machine are not supplying electrical power to external power consumers, it may be possible to compensate for conditions that might increase spark plug fouling when the engine and electric machine are not providing electrical power to external power consumers so that spark plug fouling may not occur prematurely when the engine and electric machine are providing power to external electrical power consumers. Method 400 proceeds to 452.

Optionally, at 452, method 400 allows a value of a second accumulator, or alternatively, a second timer to increase if method 400 judges that the engine is presently operating in a carbon reducing region (e.g., an engine operating region where an amount of carbon deposits on a spark plug is decreasing) as described at 406. By allowing the second timer or accumulator values to increase when the engine and electric machine are not supplying electrical power to external power consumers, it may be possible to compensate for conditions that might reduce spark plug fouling when the engine and electric machine are not providing electrical power to external power consumers so that initiating of a carbon reducing state may be avoided when vehicle driving conditions reduce carbon deposits on spark plugs. Method 400 proceeds to 454.

At 454, method 400 operates the engine and the electric machine responsive to the driver demand torque and vehicle speed. For example, the engine and electric machine may provide the requested driver demand torque without supplying electrical power to external electrical power consumers. Method 400 proceeds to exit.

The method of FIG. 4 provides for a powertrain operating method, comprising: characterizing each of a plurality of engine operating regions as one or more carbon building regions and one or more carbon removing regions; measuring an amount of time an engine operates in the one or more of the carbon building regions via a controller while the engine rotates an electric machine that provides power to external power consumers; and adjusting operation of the engine to operate in one or more of the carbon removing regions while the engine rotates the electric machine that provides power to the external power consumers in response to the amount of time exceeding a threshold. The method further comprises not supplying electrical power to an electric energy storage device of a vehicle while the engine operates in the one or more of the carbon building regions. The method further comprises supplying electrical power to the electric energy storage device of the vehicle while the engine operates in the one or more of the carbon removing regions. The method includes where the one or more carbon building regions are engine speeds and loads where carbon builds on one or more engine spark plugs. The method includes where the one or more carbon removing regions are engine speeds and loads where carbon is removed from one or more engine spark plugs. The method includes where the electric machine does not supply additional power to the external power consumer in response to the amount of time exceeding the threshold. The method includes where the electric machine supplies power to an electric energy storage device in response to the amount of time exceeding the threshold. The method further comprises increasing output of the electric machine in response to the amount of time exceeding the threshold.

The method of FIG. 4 also provides for a powertrain operating method, comprising: adjusting a first value responsive to an amount of time an engine operates in one or more carbon building regions via a controller; adjusting a second value responsive to an amount of time an engine operates in one or more carbon removing regions via a controller; and adjusting operation of an engine via a controller to operate in the one or more of the carbon removing regions in response to the first value exceeding a first threshold and the second value not exceeding a second threshold. The method further comprises resetting the first value to zero and the second value to zero in response to the first value exceeding the first threshold and the second value exceeding the second threshold. The method includes where the first value is based on one or more carbon building region multipliers. The method includes where the second value is based on one or more carbon removing region multipliers. The method includes where the first value and the second value reside within memory of the controller. The method further comprises increasing output of an electric machine in response to the first value exceeding the first threshold and the second value not exceeding the second threshold.

In another representation, the method of FIG. 4 provides for a powertrain operating method, comprising: characterizing each of a plurality of engine operating regions as one or more carbon building regions, one or more carbon removing regions, and one or more carbon neutral regions; measuring an amount of time an engine operates in the one or more of the carbon building regions via a controller while the engine rotates an electric machine that provides power to external power consumers; and adjusting operation of the engine to operate in one or more of the carbon removing regions while the engine rotates the electric machine that provides power to the external power consumers in response to the amount of time exceeding a threshold. The method further comprises not supplying electrical power to an electric energy storage device of a vehicle while the engine operates in the one or more of the carbon building regions and the value of the first timer or accumulator is less than the first threshold and the value of the second timer or accumulator is less than the second threshold.

Referring now to FIG. 5, a plot 500 of example carbon building, carbon reducing, and carbon neutral operating regions is shown. The vertical axis represents engine load and engine load increases in the direction of the vertical axis arrow. The horizontal axis represents engine speed and engine speed increases in the direction of the horizontal axis arrow.

Plot 500 shows a carbon building region 502 that is shown at lower engine speeds and loads. Region 502 is bounded via line 503 and it includes all of the cross-hatched area. Carbon may tend to accumulate on engine spark plugs if the engine is operated in this region for an extended period of time. Plot 500 also shows a carbon neutral region 504 that is shown at middle engine speeds and engine loads. Region 504 is bounded by line 503 and by line 505. Carbon may tend not to accumulate or be removed when the engine is operated in this operating range. Finally, plot 500 also shows a carbon removing region 506 that is shown at higher engine speeds and engine loads. Region 506 is bounded by line 505 and it is indicated by the hatched area. Carbon may tend to be removed or oxidized from engine spark plugs when the engine is operated in this operating range.

It should be understood that the engine may include carbon regions that are different than those shown in FIG. 5 without exceeding the scope of this disclosure. For example, an engine may have three distinct and separate carbon reducing regions, two carbon neutral regions, and two carbon building regions. Further, each of these carbon regions may be assigned a unique multiplier value as described in the method of FIG. 4.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A powertrain operating method, comprising:

characterizing each of a plurality of engine operating regions as one or more carbon building regions and one or more carbon removing regions;

measuring an amount of time an engine operates in the one or more of the carbon building regions via a controller while the engine rotates an electric machine that provides power to external power consumers; and adjusting operation of the engine to operate in one or more of the carbon removing regions while the engine rotates the electric machine that provides power to the external power consumers in response to the amount of time exceeding a threshold.

2. The method of claim 1, further comprising not supplying electrical power to an electric energy storage device of a vehicle while the engine operates in the one or more of the carbon building regions.

3. The method of claim 2, further comprising supplying electrical power to the electric energy storage device of the vehicle while the engine operates in the one or more of the carbon removing regions.

4. The method of claim 1, where the one or more carbon building regions are engine speeds and loads where carbon builds on one or more engine spark plugs.

5. The method of claim 1, where the one or more carbon removing regions are engine speeds and loads where carbon is removed from one or more engine spark plugs.

6. The method of claim 1, where the electric machine does not supply additional power to the external power consumers in response to the amount of time exceeding the threshold.

7. The method of claim 6, where the electric machine supplies power to an electric energy storage device in response to the amount of time exceeding the threshold.

8. The method of claim 1, further comprising increasing output of the electric machine in response to the amount of time exceeding the threshold.

9. A powertrain operating method, comprising:
adjusting a first value responsive to an amount of time an engine operates in one or more carbon building regions via a controller;
adjusting a second value responsive to an amount of time an engine operates in one or more carbon removing regions via a controller; and
adjusting operation of an engine via a controller to operate in the one or more of the carbon removing regions in response to the first value exceeding a first threshold and the second value not exceeding a second threshold.

10. The method of claim 9, further comprising resetting the first value to zero and the second value to zero in response to the first value exceeding the first threshold and the second value exceeding the second threshold.

11. The method of claim 9, where the first value is based on one or more carbon building region multipliers.

12. The method of claim 9, where the second value is based on one or more carbon removing region multipliers.

13. The method of claim 9, where the first value and the second value reside within memory of the controller.

14. The method of claim 9, further comprising increasing output of an electric machine in response to the first value exceeding the first threshold and the second value not exceeding the second threshold.

15. A system, comprising:
an engine in a hybrid vehicle driveline;
an electric machine in the hybrid driveline; and
a controller including executable instructions stored in non-transitory memory to adjust operation of the engine in response to an amount of time the engine operates in one or more carbon building regions exceeding a threshold while the electric machine is electrically coupled to an external electric power consumer.

16. The system of claim 15, where adjusting operation of the engine includes increasing engine speed and load.

17. The system of claim 16, further comprising additional instructions to increase output of the electric machine in response to the amount of time the engine operates in one or more carbon building regions exceeding the threshold.

18. The system of claim 17, further comprising additional instructions to store the increased output of the electric machine in an electric energy storage device.

19. The system of claim 15, where operation of the engine is adjusted while a transmission coupled to the electric machine is engaged in park.

20. The system of claim 15, further comprising adjusting operation of the engine in further response to an amount of time the engine operates in one or more carbon removing regions being less than a threshold.

* * * * *